July 21, 1959  H. B. FUGE  2,896,140
MOTOR CONTROLS FOR WINDING MACHINES
Filed April 26, 1955

INVENTOR.
Harry B. Fuge
BY
ATTORNEY

United States Patent Office 2,896,140
Patented July 21, 1959

2,896,140

MOTOR CONTROLS FOR WINDING MACHINES

Harry B. Fuge, Somerville, N.J., assignor to The Singer Manufacturing Company, Elizabeth, N.J., a corporation of New Jersey Application April 26, 1955, Serial No. 503,907

7 Claims. (Cl. 318—6)

This invention relates to speed control systems for electric motors and more particularly to a motor drive for winding machines for winding or spooling yarn wherein it is desired to wind the yarn under uniform tension into a cone-shaped package.

Without some form of control, the linear speed of the yarn would normally increase due to the build-up of the spool diameter and this is objectionable because it tends to produce variations in the yarn tension throughout the spool, and it is more difficult accurately to predict the machine running time, which is an important consideration where several machines are tended by one operator.

It is therefore a primary object of this invention to provide a control system for a winding machine in which the winding strand is maintained at a constant linear speed regardless of spool diameter build-up.

This is accomplished in accordance with this invention by winding the yarn strand, as it passes between the supply and wind-up spools, around a monitor spindle which drives a contact-making governor. The governor is, in effect, a speed-responsive, single-pole, double-throw switch controlling the current flow selectively to thermal relays which selectively energize the windings of a control motor for forward or reverse rotation. A variable-voltage transformer is driven by the control motor to raise or lower the voltage applied to the spool-driving motor to hold constant the linear speed of the yarn as monitored by the governor.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby, will be readily understood by those skilled in the art.

Figure 1:
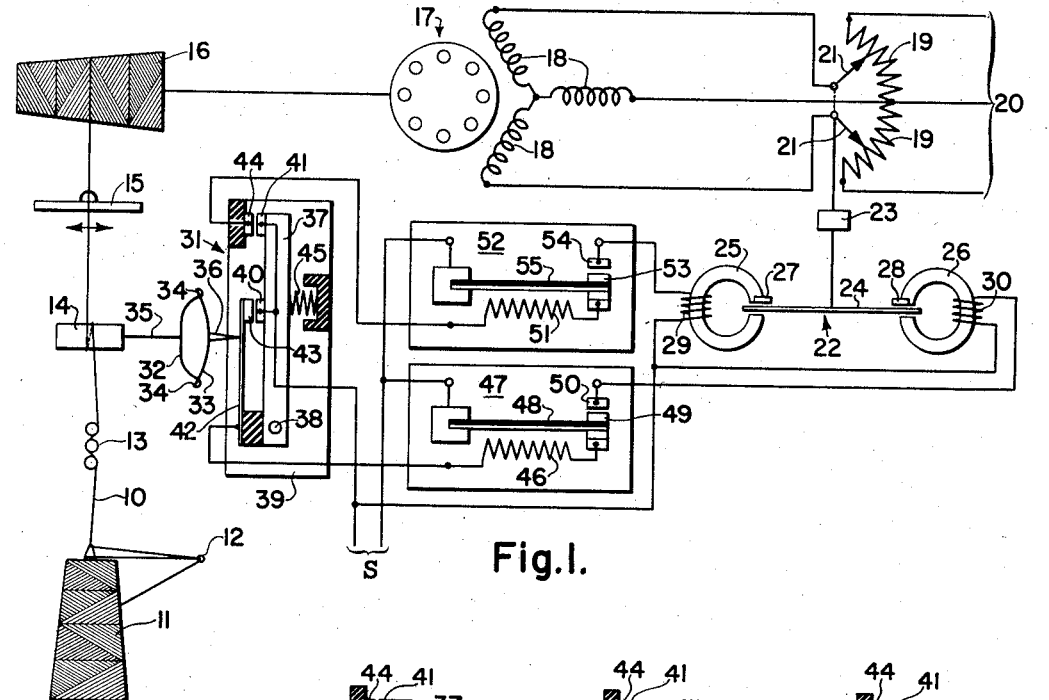
Figure 2:
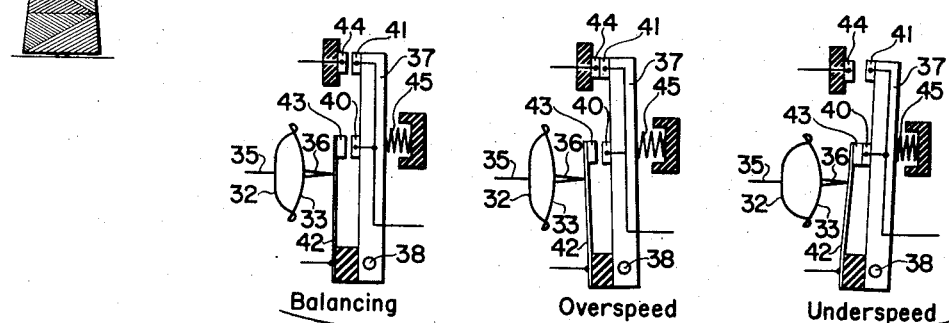
Figure 3:
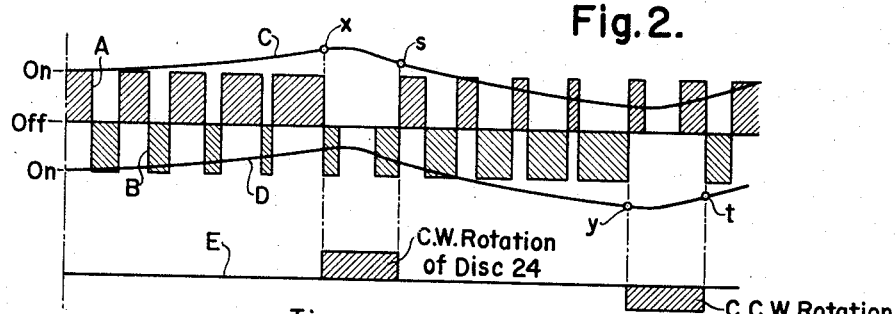

In the drawings, Fig. 1 is a schematic diagram of the system embodying the invention. Fig. 2 is a diagrammatic representation of the governor of this invention showing three fundamental speed conditions. Fig. 3 shows time diagrams illustrating the time integrating effect of the thermal relays.

Referring now to Fig. 1, a yarn strand 10 is led from a supply spool 11 through a rotatable guide 12, through a friction drag device 13, thence with a turn around a monitor spindle 14, through a lay transverse mechanism 15 to a wind-up spool 16. The wind-up spool 16 is driven preferably by a polyphase induction motor 17 whose windings 18 are fed from two variable voltage transformers 19 connected in open-delta to a three-phase supply 20 of electrical energy.

The sliders 21 of the variable voltage transformers are ganged together and driven simultaneously from a control motor 22 through a gear reduction 23. Preferably the control motor 22 is of the induction type having an eddy-current disc 24 and two stator elements 25, 26 carrying respective shading coils 27, 28 and windings 29, 30. The construction is such that the A.C. excitation of either stator element produces in the disc opposite torque from that produced by excitation of the other stator element. Thus rotation of the disc may be reversed by selective excitation of the stator elements 25, 26 thereby producing a raising or lowering of the voltage applied to the polyphase windings of the spool-driving motor.

Secured for rotation with the monitor spindle 14 is a speed-responsive contact-making governor 31 of the general type shown and described in the U.S. Patent No. 2,293,996, J. M. Naul, to which reference may be had for a more complete explanation of its operation.

The rotatable element of the governor comprises two opposed bow-springs 32, 33 carrying weights 34 at their outer junctures. One bow-spring 32 is centrally connected to a shaft 35 driven by the monitor spindle 14 and the other bow-spring 33 carries an actuator button 36 which moves axially in response to changes in the flexure of the bow-springs occasioned by changes in the angular speed of the spindle 14. The contact structure comprises a rigid arm 37 pivoted at 38 on a support 39 and carrying two contacts 40, 41 electrically connected together. A spring arm 42 connected to but electrically insulated from the arm 37 carries a contact 43 which cooperates with the contact 40. A stationary contact 44 cooperates with contact 41. A biasing spring 45 urges the contact assembly into contact with the button 36. The balancing speed may be predetermined by the axial position of the support 39 relative to the actuator button 36 and this spacing may be made adjustable. Referring to Fig. 2, the balancing speed occurs when neither set of contacts is closed or both sets are closed for the same average time due to traverse vibration. For overspeed the contacts 41 and 44 are closed and for underspeed the contacts 40 and 43 are closed. Contacts 40 and 43 control the connection of a heater 46 in thermal relay 47 to a low voltage electrical supply S and if the contacts 40, 43 remain closed for a sufficient average time, the relay 47 will operate and flex a bimetallic strip 48 to close contacts 49, 50 and to connect the motor coil 30 to the low voltage supply S and produce rotation of the disc rotor 24 in one direction. Similarly, contacts 41 and 44 control the energizing of a heater 51 in thermal relay 52 and if they remain closed long enough on the average, the relay contacts 53 and 54 will close responsive to flexure of bimetallic strip 55 to connect the motor coil 29 to the low voltage supply S and produce rotation of the disc 24 in the reverse direction.

It will be noted that instantaneous closure of the governor contacts will have no immediate effect on the control motor because the heaters must be energized for an average time long enough to produce sufficient heating of the respective bimetallic strips 48, 55 to cause relay actuation. Operation of either thermal relay 47 or 52 immediately opens the heater circuit to that particular relay and it starts to cool so that it shortly resets itself and is ready for another cycle of operation.

The use of thermal relays in this manner produces a response time lag which makes the system insensitive to small momentary changes of speed and also provides anticipatory action which prevents hunting and instability.

The control elements, i.e., the governor, the thermal relays, control motor and variable transformers form a small self-contained rugged unit which may readily be placed at some distance from the spool-driving motor. The governor contacts do not have to break the driving motor current which is heavy and destructively inductive in nature, and the contacts should thus have a long useful life. By using suitably-sized variable voltage transformers, a driving motor of any size up to several horsepower rated output can be successfully controlled using only the same light duty governor, of the general type used for speed control in domestic food mixers.

The vibration caused by the winder lay traverse mechanism 15 which leads the yarn strand 10 onto the wind-up spool 16 produces a continual dither in the governor contacts which actually increases the effective sensitivity by eliminating static drag. In actual operation, then, a certain amount of vibration is present in the winding machine which causes the governor to make alternate closures between the high speed contacts 41, 44 and the low speed contacts 40, 43. Thus, to a degree, pulsed current is flowing in both heater circuits when the governor speed is approximately at the desired balancing value. Under these conditions, the duration of closure of the governor contacts is not sufficient to heat either heater of the thermal relays to the operating point. When the speed of the spindle 14 departs from the desired value, say by increasing due to spool-diameter build-up, the duration of closure of contacts 41, 44 increases and the duration of closure of contacts 40, 43 decreases, until eventually the average heating effect on heater 51 is sufficient to cause closure of contacts 53, 54 to energize the stator winding 29 to rotate the disc 24 to decrease the voltage applied to the motor winding 18. A similar unbalanced pulsing action takes place if the speed should decrease below the desired value but, in this case, the closure of contacts 40, 43 is favored and the voltage on the spool-driving motor 17 is increased to correct the speed departure.

This action is illustrated in Fig. 3 wherein are shown time diagrams illustrating the averaging effect of the thermal relays on the control response. Curve A denotes the heater current of relay 52 and curve B denotes the heater current of relay 47. Curve C is the average heating effect or temperature in relay element 55 and curve D is the corresponding characteristic for relay element 48. Points x and y denote values of average heating for closure of respective motor control contacts 53, 54 and 49, 50 and points s and t the corresponding values for control contact opening. It will be noted from curve E that the control motor is not energized for each closure of the governor contacts but only if the average time of closure is sufficient. The cross-hatched areas in curve E denote the periods during which the control motor is energized and those areas above the zero axis denote forward or clockwise rotation of the control motor while those below the zero axis denote backward or counter-clockwise rotation of the control motor.

From the above, it will be perceived that, according to this invention, variations in the rotational speed of the monitor spindle 14 are detected by the governor 31 and translated through the thermal relays 47 and 52 as averaged corrective signals to the reversible control motor 22 which drives the variable transformers 19 which apply an increased or decreased voltage to the spool-driving motor 17 to change its speed to compensate for the spool-diameter build-up and thus render constant the linear speed of the yarn 10.

If a constant resistance drag is imposed on the yarn strand from the supply spool as at 13 and if its linear speed is held constant, it follows that the tension in the yarn strand 10 will be constant, which is the desirable final result sought to be accomplished.

Having thus described the nature of the invention, what I claim herein is:

1. In a control system for maintaining constant the angular speed of a shaft, an electric motor for driving said shaft and connected thereto through a continuously changing speed-ratio transmission, a two-circuit centrifugal contact-making governor driven by said shaft, thermal relays having heater elements energized responsively to operation of said governor, an eddy-current disc, stator elements energized by said relays for producing opposite torques in said disc, a variable transformer driven mechanically by said disc and connected electrically to said electric motor for supplying a variable voltage thereto, whereby the changing speed ratio may be compensated to hold the angular shaft speed constant.

2. In a speed control system for an electric motor, a shaft driven by said motor and subject to speed variations, a source of electrical energy, a variable transformer with its input connected to said energy source and its output connected to said motor, a movable element for varying the output voltage of said transformer, an eddy-current disc operatively connected to drive the movable element, stator elements for producing equal and opposite torques on the disc, thermal relays having heater elements for selectively energizing said stator elements, and a centrifugal contact-making governor driven by said shaft and having contacts which when closed provide circuits for selectively energizing the heater elements of said thermal relays.

3. An electric motor speed control system comprising, in combination, a source of electrical energy, a shaft, a power motor connected to drive said shaft through a transmission of continuously changing speed-ratio, a two-circuit centrifugal contact-making governor driven by said shaft for selectively energizing one of two circuits responsive to the speed of said shaft relative to a predetermined speed, thermal relays having heater elements included respectively in each of said circuits for averaging out small pulses of energy supplied by the governor, a control motor, stator winding elements thereof energized selectively by said relays to produce opposite rotations of said control motor, a variable transformer mechanically connected to be driven by said control motor and electrically connected to modify the voltage supplied to the power motor from said source of electrical energy.

4. Apparatus as set forth in claim 3, in which the control motor is an induction eddy-current disc with stator-winding elements on opposed shaded poles for producing opposite torques on said disc.

5. Apparatus as set forth in claim 3, in which the power motor is a three-phase motor and the variable transformer comprises two ganged, single-phase units connected in open-delta.

6. In a machine for winding yarn, a wind-up spool, an electric motor for driving said wind-up spool, a capstan driven by a moving strand of said yarn on its way to the wind-up spool, a two-circuit, centrifugal contact-making governor driven by said capstan to monitor the linear speed of said yarn, thermal relays having heater elements selectively energized responsively to operation of said governor responsive to average capstan speeds above and below a predetermined value, an eddy-current rotor, stator winding elements associated with said rotor and energized selectively by said relays to apply reversed torques to said rotor, and a variable transformer connected electrically to said spool-driving motor to supply thereto a variable voltage from a substantially constant voltage source, said transformer having rotatable elements driven mechanically by said rotor to effect said variable voltage to modify the speed of the spool-driving motor to maintain substantially constant the linear speed of the yarn.

7. An electric motor speed control system comprising, in combination, a source of electrical energy, a shaft, a power motor unit connected to drive said shaft through a transmission of continuously changing speed-ratio, a two-circuit centrifugal contact-making governor driven by said shaft for selectively energizing one of two circuits responsive to the speed of said shaft relative to a predetermined speed, thermal time-delay relays having heater elements included respectively in each of said circuits for averaging out small pulses of energy supplied by the governor, and means energized by said relays for controlling said power motor unit to provide a constant angular speed of said shaft.

References Cited in the file of this patent

UNITED STATES PATENTS

| | | |
|---|---|---|
| 1,801,598 | Evans | Apr. 21, 1931 |
| 2,353,408 | Larsen | July 11, 1944 |
| 2,542,854 | Wilson | Feb. 20, 1951 |